United States Patent [19]

Peter et al.

[11] 4,414,758
[45] Nov. 15, 1983

[54] CONVEYOR FOR COOLING AND REMOVAL OF OBJECTS FROM AN IN-LINE SECTIONAL PRODUCTION MACHINE

[76] Inventors: Fritz Peter, Binzmühlestr. 405, CH-8046 Zürich; Gastonge Murialdo, Gaggio di Bioggio, CH-6981 Vernate, both of Switzerland

[21] Appl. No.: 246,420

[22] Filed: Mar. 23, 1981

[51] Int. Cl.³ .............................................. F26B 25/00
[52] U.S. Cl. ......................................... 34/233; 34/20; 34/236; 198/486; 198/490
[58] Field of Search ..................... 34/54, 155, 20, 233, 34/236; 198/486, 490; 251/DIG. 2

[56] References Cited

U.S. PATENT DOCUMENTS

| | | | |
|---|---|---|---|
| 1,888,440 | 11/1932 | Waugh, Jr. | 198/486 |
| 1,974,837 | 9/1934 | Shillinger et al. | 198/486 |
| 2,660,831 | 12/1953 | Rowe | 198/486 |
| 3,776,342 | 12/1973 | Kulig et al. | 198/486 |
| 3,973,582 | 8/1976 | Siebold | 251/DIG. 2 |
| 4,299,532 | 11/1981 | Bouwmeester | 198/486 |
| 4,312,139 | 1/1982 | Preisler et al. | 34/54 |

*Primary Examiner*—Larry I. Schwartz
*Attorney, Agent, or Firm*—Thompson, Birch et al.

[57] ABSTRACT

A conveyor used to move and if necessary cool objects from a multiple sections in-line production machine, such as a thermoforming machine. The design is sectional, each section comprising a cooling station with high-low control of the cooling media and a push-out device used to transfer the objects from the cooling plate onto the moving conveyor belt. The pusher consists of an arm swinging around a stud, the latter also moving on a circular path, the correct sequence being obtained from a control box timed by the corresponding production machine section. The sections are secured together in the number corresponding to the number of sections of the production machine thus providing a suitable conveyor for a machine with any number of sections.

12 Claims, 9 Drawing Figures

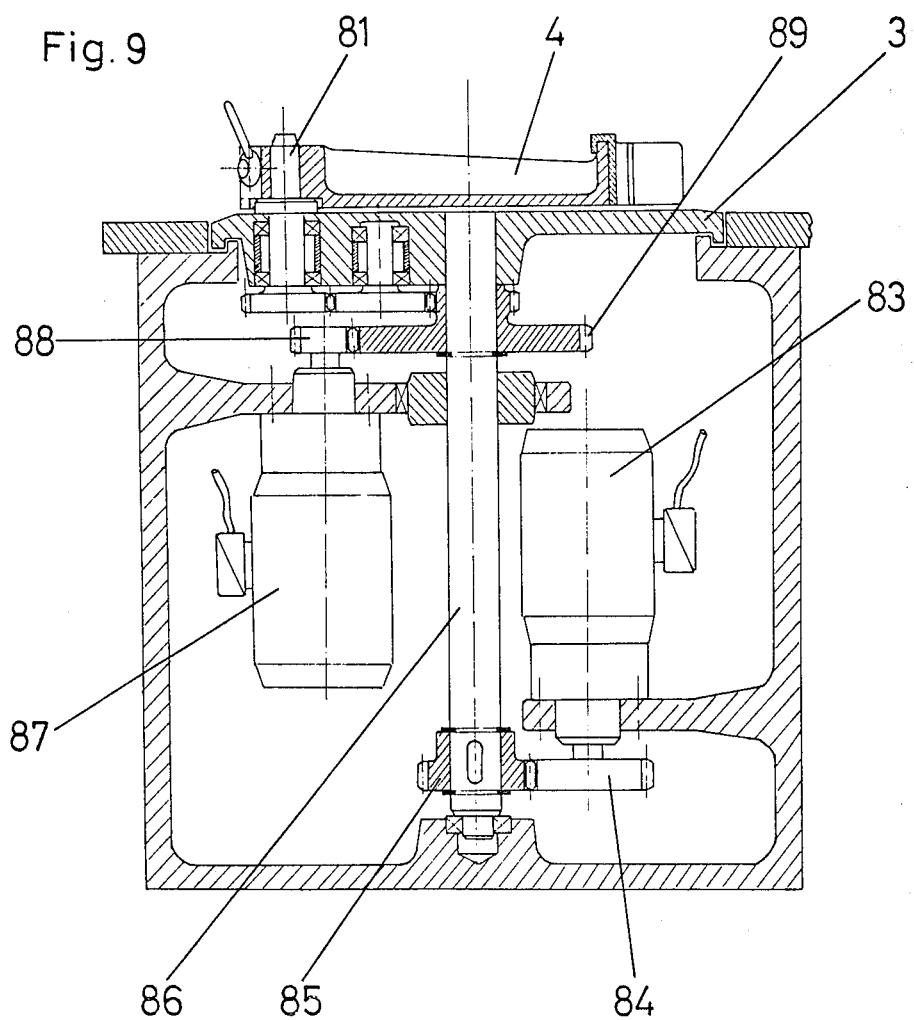

CONVEYOR FOR COOLING AND REMOVAL OF OBJECTS FROM AN IN-LINE SECTIONAL PRODUCTION MACHINE

BACKGROUND

Many production machines in use today, in particular glass container forming machines are constituted by a plurality of identical sections, typically 4 to 10 sections, arranged in a straight line. Each section can be considered as an independent forming machine whereby only the timing relationship between the different sections is controlled by a common drive and timing system. The forming process is completed when a pair of tongs lifts the finished object out of the forming mold and swings it forward in front of the machine section where finally the tongs open releasing the object. In order to further cool the formed objects, which at this moment are still hot and to remove them from the forming area, a conveyor is mounted in front of the sections, the direction of travel of its belt being at a right angle relative to the alignment axis of the forming sections.

Mounted to the conveyor beam are cooling stations, one for each forming section. The cooling stations each consist of a metal box whose cavity is supplied with the cooling medium, typically fan air. On top of the cooling box a perforated plate releases the cooling air and cools the finished object while it is suspended over the cooling station and later, when the tongs open and release the object, while the latter is standing on the plate itself.

Before the next formed object is swung forward by the tongs, the previous object is pushed onto the conveyor belt which is continuously moving and carries the object away. In former conveyors this action was provided by an arm mounted on a pivot and actuated by a cam. The arm which carries at its end a finger shaped to suit the contour of the object is swung in a short arc, typically 25° to 35°, thereby gently pushing the object onto the conveyor belt. The cams actuating the pusher arms are secured on a common camshaft mounted along the length of the conveyor. The time required by the camshaft to make a full revolution corresponds to the cycle time of each forming section. Thus, by securing the cams in a position relative to each other corresponding to the timing sequence of the sections, each pusher maintains an equal time relationship to its respective machine section.

The conveyor camshaft is driven by the same drive system that drives the timers of the sections thus ensuring synchronous speed. A mechanical or electrical differential makes it possible to advance or retard the position of the camshaft relative to the machine sections thereby providing a means to adjust the dwell time during which the objects are resting on the cooling plate before being pushed onto the conveyor belt. By properly selecting the timing sequence of the forming sections and of the pusher cams, and with an appropriate belt speed, the objects will be placed in an equally spaced row on the conveyor belt.

It is common practice nowadays to produce several identical objects at one time in one single forming cycle. This is accomplished by feeding simultaneously a plurality of identical forming molds, typically 2 to 4, mounted in line in the same section. In this case every forming section is releasing simultaneously a plurality of objects which are located by the tongs onto the cooling plate aligned on an axis at a right angle relative to the belt travel. It is a requirement that, in order to facilitate the further operations downstream of the forming area, such as transferring, stacking, etc., that the objects be aligned along a straight line and evenly spaced. Therefore, the simple pusher arm as described above is not satisfactory when multiple mold production is performed.

So, it has become common practice to use a different pushout device, called a 90° pusher. The same basic system of camshaft and cams actuate, on every section, an intermediate arm which, by means of a lever and a chain or a link imparts a rotation of 90° to the pusher unit. The pusher unit, which is enabled to rotate around a vertical axis, carries on its top a horizontally mounted pneumatic cylinder whose mobile portion, be it the piston or the cylinder itself, carries at its end the pusher fingers. The working sequence is as follows: in its initial position the pusher is pointing towards the objects on the cooling plate, the axis of the pneumatic cylinder being parallel to the direction of the belt travel. In this position compressed air is admitted to the cylinder whose mobile part extends until its fingers are in contact with the standing objects. At this point the cam imparts a rotation to the pusher unit which is gradually accelerated. When the pusher has accomplished 90° of rotation, i.e. when the axis of the pusher cylinder is at a right angle to the axis of the conveyor belt and the various objects are positioned on a straight line parallel to the direction of belt travel, another port opens and admits compressed air to reverse the action of the pneumatic cylinder. The mobile portion of the cylinder retracts and avoids any interference of the pusher fingers with the objects which meanwhile are carried away by the conveyor belt. With the pneumatic cylinder still retracted the pusher swings back by 90° and it is ready to start another cycle as just described. The 90° pusher has the advantage over the simple pusher arm that all the objects are pushed in a single row parallel to the direction of belt travel. Furthermore, during the return movement the pneumatic cylinder and its fingers are kept retracted avoiding any interference with the newly formed objects which meanwhile have been deposited onto the cooling plate.

This feature avoids the need to make a time allowance for the pusher to complete its cycle and return to rest before the next set of objects is released on the cooling plate, i.e. as soon as the previous set of objects clears the cooling plate the next set can be released on its. This makes it possible to keep the objects on the cooling plate for a longer period of time, thus providing more cooling which in turn accomodates faster production rates. Of course, also with multiple mold production there is a need to obtain an evenly spaced row of objects on the conveyor belt. With the 90° pusher this is achieved by locating the fingers on the pusher arm at a distance between each other which correspond to the belt spacing in single mold production devided by the number of molds. In this way a row of uniformly spaced objects is obtained. Another feature current on modern conveyors is the high-low control of the cooling air flow. In order to obtain faster production speeds the highest possible amount of cooling is applied. This is easily done while the objects are still suspended on the tongs. When the objects are standing on the cooling plate, the amount of cooling air which can be applied is limited by the stability of the objects which, if excessive air pressure is applied, may start to elevate and eventually tilt and roll off the cooling plate. Therefore, a high-low device has been added which consists of a butterfly or tappet valve located in the cooling box or in the duct leading the air into it. The high-low device is actuated by a pneumatic cylinder timed by the respective section. While the objects are still suspended on the tongs over the cooling plate the valve is kept opened in the "high" position providing a faster rate of cooling. When the tongs release the objects the valve closes to the "low" position providing the amount of cooling which is compatible with the stability of the objects while standing on the cooling plate or being transferred towards the conveyor belt. Both the "high" and the "low" positions of the valve are adjustable.

In order to provide additional cooling, modern conveyors incorporate the facility to apply additional cooling also while the objects are transported on the conveyor belt. This feature is obtained by providing a number of holes or slots on the hollow beam supporting the conveyor belt. Between the beam and the belt a number of perforated plates are installed which can be adjusted to clear or cover the holes in the conveyor beam. The hollow beam accomodates a flow of cooling air and the action of the perforated plates provides a means to adjust the rate of the "under-the-belt" cooling.

The above describes the state of the art in conveyor design. The operation of the state of the art conveyor is still a source of numerous problems which are summarized below as follows:

1. The 90° pusher is limited in the precision of positioning and operational speed by weaknesses inherent to its very principle. Ideally, the pusher arm should accelerate in such a manner that the pusher fingers push the objects, at the instant they clear the fingers and are carried away by the belt, at a peripheral speed matching the speed of the belt. However, virtually at the same point in time, the rotational movement must come to standstill in order to allow the fingers to retract. The deceleration requires a certain time and displacement. If the deceleration phase is started before the 90° rotation is completed, then the peripheral speed at the instance when the objects clear the fingers is no longer equal to the belt speed. Thus, the set of objects will tend to be positioned on the belt along an inclined axis, the front one (in the direction of belt travel) being pushed further away than the rear one. If the deceleration path is maintained over the right angle position, i.e. if the pusher is allowed to turn over 90°, then again a staggered line of objects will result, this time the rear object being pushed further away. In addition, the pneumatic stroke, albeit cushioned, provokes at the end of each stroke a jerk which can cause an unstable object to tilt.

2. The equal spacing of the objects is dependent on the accuracy of the cams position on the camshaft. The higher the number of sections in operation, the higher the belt speed and consequently a given inaccuracy in the position of the cams will result in a greater spacing error. With the operation of 8- and 10-sections units this becomes a serious problem.

3. The butterfly or tappet valves used to control the "high" and "low" rate of cooling do promote noisy air separation and turbulence.

4. The sliding perforated plates used to control the rate of the "under-the-belt-cooling" also cause a high level of noise.

5. In order to suit the different types and sizes of production machines with different numbers of molds per section and different spacing between the molds, various versions of conveyors are in use with different dimensions of cooling plate, different mounting distance between conveyor belt and the sections, etc. This is a disadvantage for both the manufacturer and the user of the equipment because it reduces interchangeability, increases inventories and makes maintenance more complicated.

6. The conveyors includes a unitary cross beam stretching over the total width of the production sections. Depending on the number of sections composing the production unit, different lengths of conveyors are required. This is a disadvantage for both manufacturer and user of the equipment because it reduces interchangeability, makes scheduling of production more difficult and increases inventories.

7. Depending on the location of the production unit in the manufacturing plant, the conveyor belt may move either to the right or to the left direction. The present design of the pusher makes it necessary to have a number of components which are specifically constructed for either right or left hand direction of delivery. This is a disadvantage for both manufacturer and user of the equipment because it reduces flexibility, it makes scheduling of production more difficult and increases inventories.

8. The present design of the 90° pusher does not make it possible to cover or otherwise protect the area around the pusher itself. Tilted objects are bound to fall underneath with the risk of jamming the moving parts, causing disruption of operation and damage to the equipment.

SUMMARY OF THE INVENTION

The invention provides an improved conveyor which performs the same tasks described above, whereby the disadvantages enlisted are eliminated or at least considerably reduced.

The invention embodies the following features:

1. A pusher constituted by a pusher arm which swings around a pivot, the latter also moving along a circular path. A control box powers and controls the motion of both of these moving components. With an appropriate control of the relative motion of the pivot and of the arm, the pusher fingers describe a motion appropriate for pushing the objects from the coolng plate onto the moving conveyor belt. At first the pusher fingers move in an almost linear path towards the objects standing on the cooling plate so that the pusher fingers are inserted between the standing objects without touching them. Then both pivot and arm swing out pushing the objects onto the conveyor belt. When an angle of approximately 90° is reached and the set of objects is parallel to the direction of belt travel the peripheral speed of the pusher fingers matches the speed of the conveyor belt. From this moment the pusher arm is kept at a constant angle relative to the conveyor belt while the pivot continues its movement along a circular path. At first the peripheral speed of the fingers is essentially in the direction of the belt travel, but as the pivot proceeds along its circular path, the speed component in the direction of the belt axis decreases and the speed component transverse to the belt axis increases, retracting the fingers away from the objects which meanwhile are transported by the conveyor belt. When the fingers have cleared the objects the pusher arm is swung back and also the pivot initiates its return travel, the relative position of the two components being such as to prevent the pusher fingers from reaching over the conveyor belt to interfere with the passing row of objects. At some point during the return movement a clutch interrupts the action and the pusher remains at standstill until an impulse from the respective section starts the next pusher cycle.

2. The above pusher is driven by a variable speed drive which could be independently powered or connected to the production machine drive, for instance from the same motor driving the conveyor belt. The variable speed adjustment allows the speed of the pusher motion to be set exactly to match the speed of the belt, or to be set slightly faster or slightly slower, as best required for a smooth transfer of the objects. The timing is performed by the clutch actuated from an impulse out of the timer controlling the respective section cycle. The impulse can be advanced or retarded as required in order to obtain an equally spaced row of objects on the belt.

3. A flat leaf of a flexible material such as e.g. metal, plastic, rubber or a combination of these materials suspended to form a bow and actuated by a motor such as e.g. a pneumatic cylinder restricts or widens the passage of air into the cooling box. This provides a very simple means of obtaining "high-low" control of the cooling air. In this manner sharp corners are avoided in order to minimize noise generation.

4. To obtain a control of the "under-the-belt" cooling, plates are arranged under the belt, which incorporate a plurality of holes arranged in rows transverse to the belt axis. The holes in the plates match with the holes in the beam segment, the latter holes being aerodinamically shaped in order to minimize noise generation. The plates can be shifted along the axis of the conveyor belt in order to assume different definite positions, each position corresponding with a given set of rows matching with the holes underneath. At each position corresponds a set of rows with a greater or a lesser number of holes and this provides an adjustment of the amount of cooling air flow without promoting excessive noise.

5. The dimensions of the cooling plate are such as to accomodate the biggest objects capable of being produced on the production machine with the greatest spacing between molds. The same conveyor can also be mounted on machines with a lesser space requirement. The entire conveyor can be mounted further or nearer to the machine sections or even in an offset position so that the objects released by the tongs are not standing on the centerline of the cooling plate. In order not to waste cooling air, the cooled portion of the cooling plate can be limited to the strict requirement of the machine configuration being used by inserting a baffle plate under the cooling plate which leaves open only that number of the air exhaust holes which are required.

6. The conveyor is built from independent segments having equal length to the machine section width. They can be bolted together in the number required to form a conveyor of the length required by any type of production machines.

7. The pusher mechanism can be converted from right hand operation to left hand operation and vice-versa without a need to change parts, but simply by rearranging the mounting position of certain components. Only the pusher arm may be of a different type between right hand and left hand operation.

8. On top of the pusher mechanism there is a rotating disc. The cooling plate can be made such as to extend up to the conveyor belt over the entire length of the segment. Cooling plate, revolving disc, conveyor belt and other additional cover plates are mounted with their upper edges in the same plane in order to form an even horizontal platform over which only the pivot and the pusher arm are extending. This feature prevents fallen objects from rolling underneath the conveyor, thus improving working conditions and functional reliability.

DRAWINGS

In the following a preferred embodiment of the invention will be described in detail with reference to the accompanying drawings wherein:

FIG. 9 is a section analogous to FIG. 4 showing an alternate embodiment of the invention and again taken on line II—II of FIG. 2.

Figure 1:
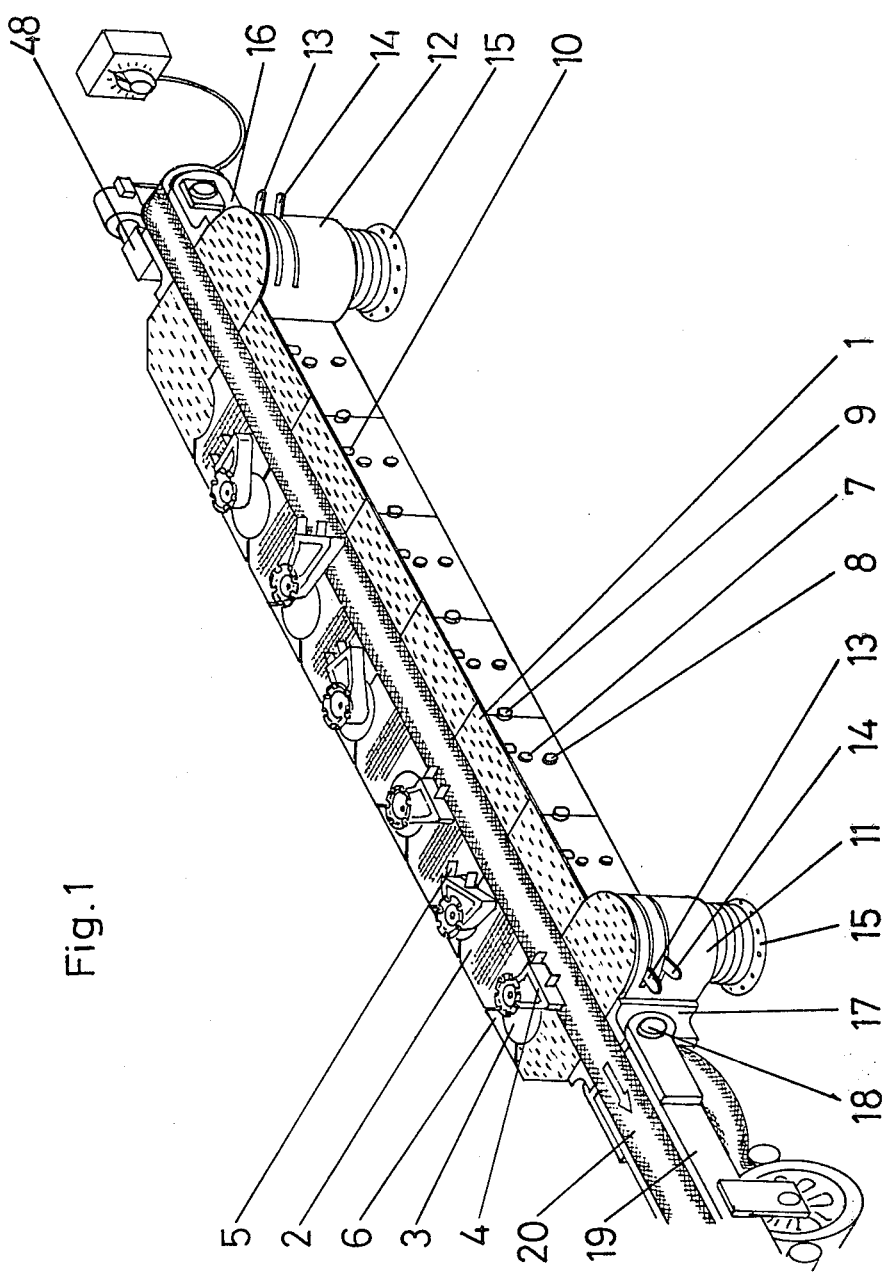
FIG. 1 shows a perspective view of a 6-section fully assembled conveyor.

FIG. 1 shows a fully assembled conveyor suitable for operation with a 6-section machine. The direction of delivery is towards the left. The conveyor is constituted by 6 identical segments, of which are visible in this view the frontcover plate 1, the cooling plate 2, the pusher disc 3, the pusher arm 4 with the pusher fingers 5, the rear cover plate 6, the adjustment knob 7 for the "high" cooling, the adjustment knob 8 for the "low" cooling, the setting knob 9 for the adjustment of the swinging motion of the pusher arm 4, the handle 10 for setting the "under-the-belt" cooling. At each end of the row of conveyor segments the left hand support 11 and the right hand support 12 are mounted. The supports 11 and 12 incorporate the following: positioning brackets which secure the entire conveyor to the machine base; height adjustment means since the conveyor must be raised or lowered to suit the dimensions of the objects produced; shut-off and setting valves controlling the cooling air for the "under-the-belt" cooling of which the control handle 13 is visible; the shut-off and setting valve controlling the supply of cooling air to the cooling plate of which the control handle 14 is visible; and the flexible connecting flange 15 which receives the cooling air from the supply duct.

Mounted on the supports there are, on the right side the end roll unit 16 and on the left side the conveyor extension connecting unit 17 which has a hinge 18 supporting the conveyor extension 19. The conveyor extension functions to transport the objects as far as necessary away from the production machine and to drive the belt 20 at the correct speed. If the conveyor is for right hand delivery the belt end roll unit 16 is mounted on the left side and the conveyor extension connecting unit 17 is mounted on the right side.

Figure 2:
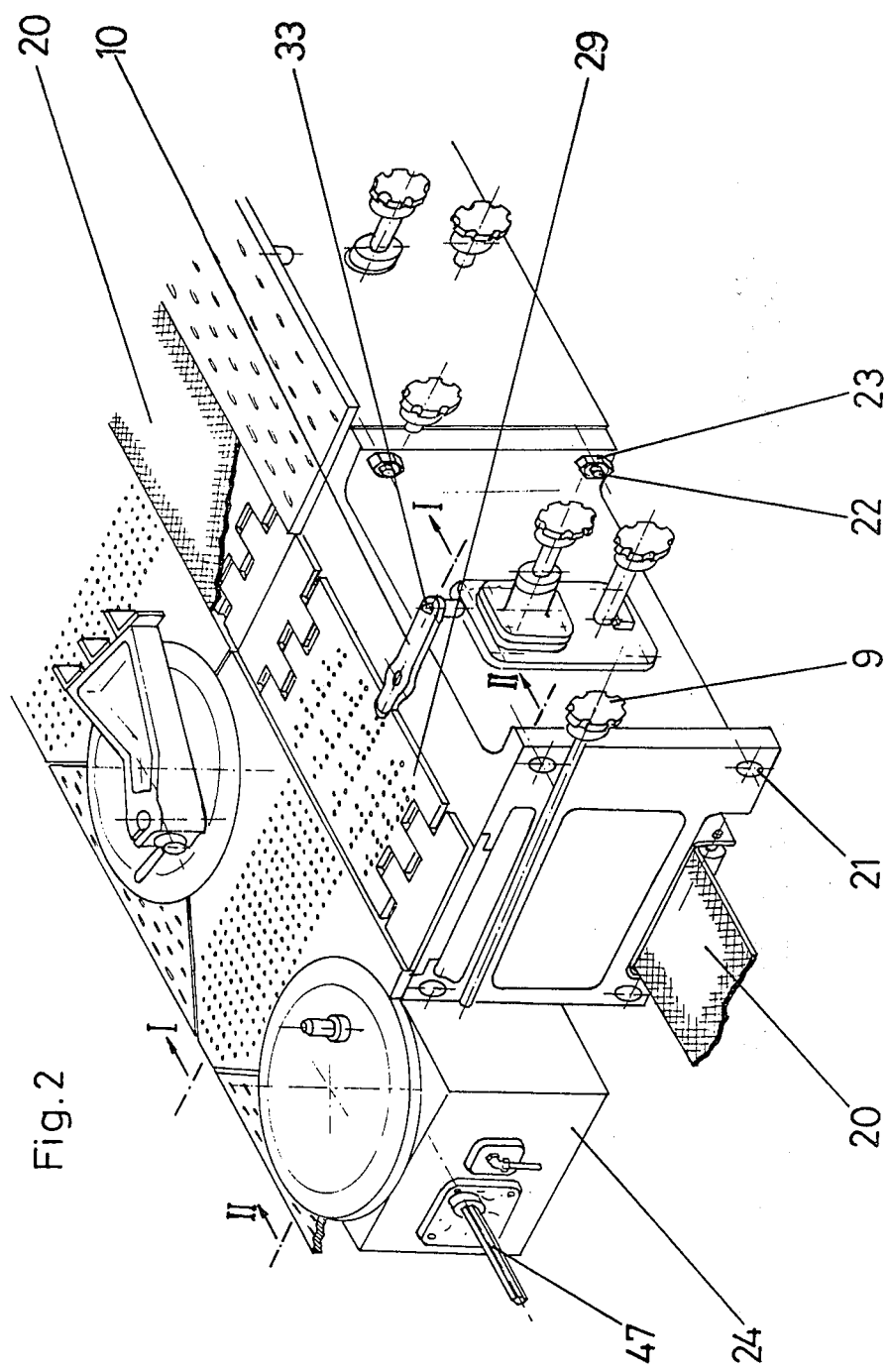
FIG. 2 shows a perspective view of two adjacent segments of the conveyor partially disassembled to expose interior details.

FIG. 2 shows the arrangement of various components and how the segments are secured together. Each segment has four holes 21 thru which the bolts 22 are inserted and tightened with the nuts 23 to the adjacent segment. The pusher mechanism 24 is secured by screws or other fasteners between two adjacent segments.

Figure 3:
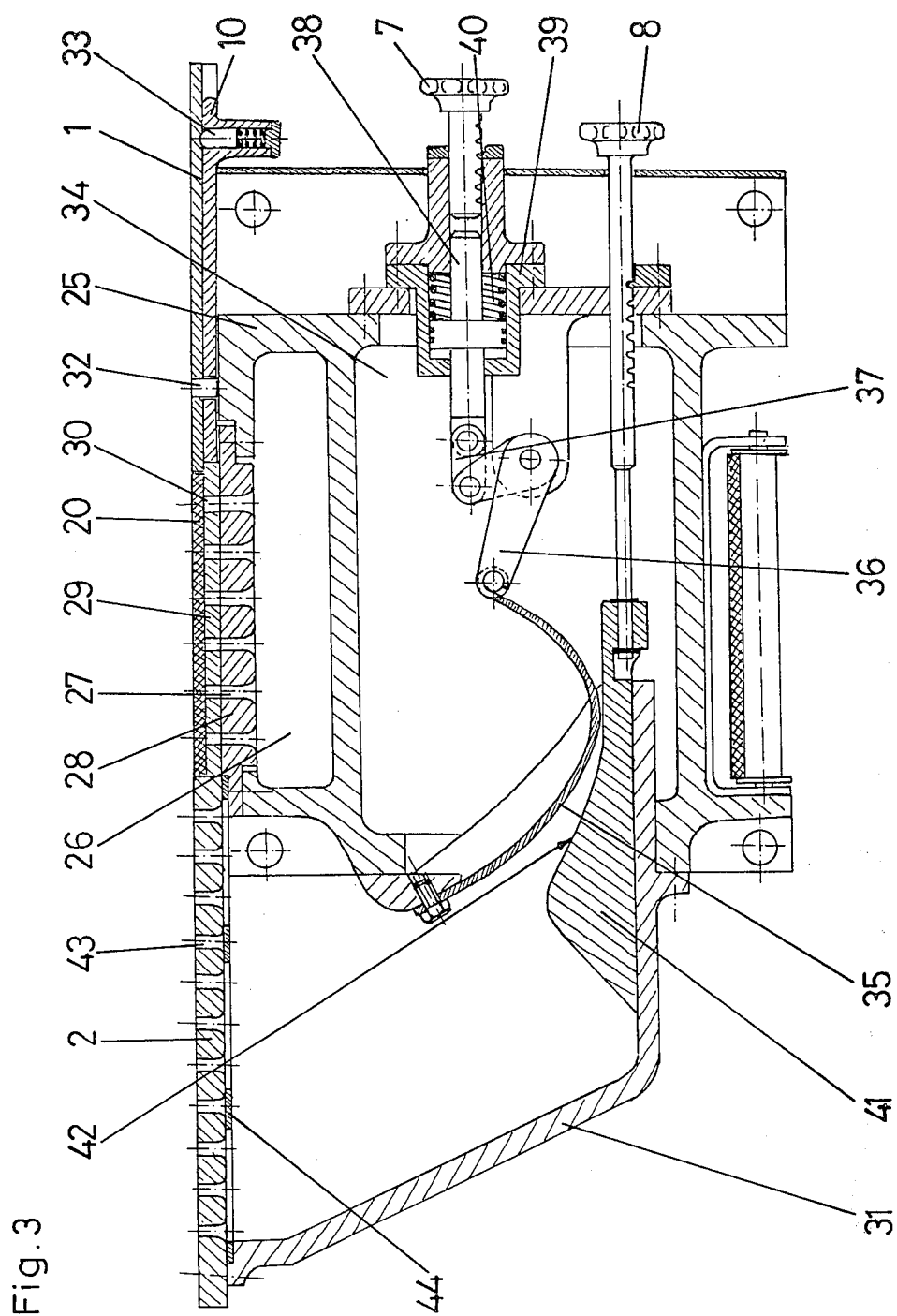
FIG. 3 is a cross section thru the conveyor segment taken on line I—I of FIG. 2.

FIGS. 2 & 3 show how the "under-the-belt" cooling and its adjustment is obtained. The beam segment 25 has an upper chamber 25 which communicates with the adjacent sections to form a horizontal duct which is supplied with cooling air from the supports 11 and 12. In the upper flange of the beam segment there are a number of holes 27 arranged in cross rows. The holes are profiled to minimize noise. In order to facilitate the machining of the profiled holes, the beam segment can be made in two pieces with a detachable upper insert 28. Between the beam segment and the conveyor belt 20 there is a sliding plate 29. The sliding plate 29 has a number of rows of holes 30 which is a multiple of the number of rows of holes in beam insert 28. One set of rows has the same number of holes corresponding to the holes underneath, the others have a constantly decreasing number of holes. The position of the sliding plate 29 is determined by the handle 10 which engages with a recess in the sliding plate 29. The handle 10 is centered on stud 32 which is part of the front cover 1. A spring loaded pin 33 engages with one of a number of notches in the lower face of front cover 1. Depending on the position of handle 10 the sliding plate 29 is positioned to align a set of rows with a greater or lesser number of holes 30 such as to constitute an adjustment of the cooling air flow.

FIG. 3 shows how the high-low control of the cooling air flow is obtained. The beam segment 25 has a lower chamber 34 which communicates with the adjacent sections to form a horizontal duct which is supplied with cooling air from the supports 11 and 12. The cooling box 31 is fastened on the vertical surface in the middle of beam segment 25 and is supplied with cooling air from the lower chamber 34. In the rectangular passage a curtain 35 of flexible material is suspended in the shape of a bow. On one side the curtain 35 is fastened to the cooling box, on the other side it is secured to lever 36, which is connected thru link 37 to the piston 38. Timed compressed air from the respective section is either connected directly to cylinder 39 or used to actuate a pneumatic valve which in turn supplies the actuating compressed air to cylinder 39. The timed air moves the piston compressing the spring 40. The stroke of the piston pulls the link 37 which causes the lever 36 to turn lifting the curtain 35 and increasing the area of the passage into the cooling box 31. This position is the "high" cooling. When the actuating air is exhausted the spring 40 pushes back the piston 38 causing the curtain 35 to be lowered restricting the cooling air passage. This position is the "low" cooling. The piston 38 is limited in its stroke by the adjustment knob 7 which provides an adjustment of the "high" cooling. In the bottom of the rectangular passage in cooling box 31 a slider 41 is fitted which is positioned by the adjusting knob 8. If the slider 41 is moved forwardly (to the right as viewed in FIG. 3), its sloping surface 42 comes nearer to the curtain 35 restricting the area of the passage. If it is moved backwards the sloping surface 42 is moved away from the curtain 35 increasing the area of the passage. In this way, by setting the adjustment knob 8, a control of the "low" cooling is obtained. The cooling air in the cooling box 31 is exhausted thru the profiled holes 43 in cooling plate 2. The holes are profiled to avoid sharp corners which would promote air separation and an inherent high level of noise. The dimensions of cooling box 31 and cooling plate 2 are such as to accommodate the biggest objects from the production machine with the biggest total mold centre distance. Baffle plate 44 enables to selectively cool only across the portion of the cooling plate 2 which is needed. Different interchangeable baffle plates could be made available depending on the space requirement of the objects producible on a given type of machine and/or the position of the conveyor relative to said machine.

Figure 4:
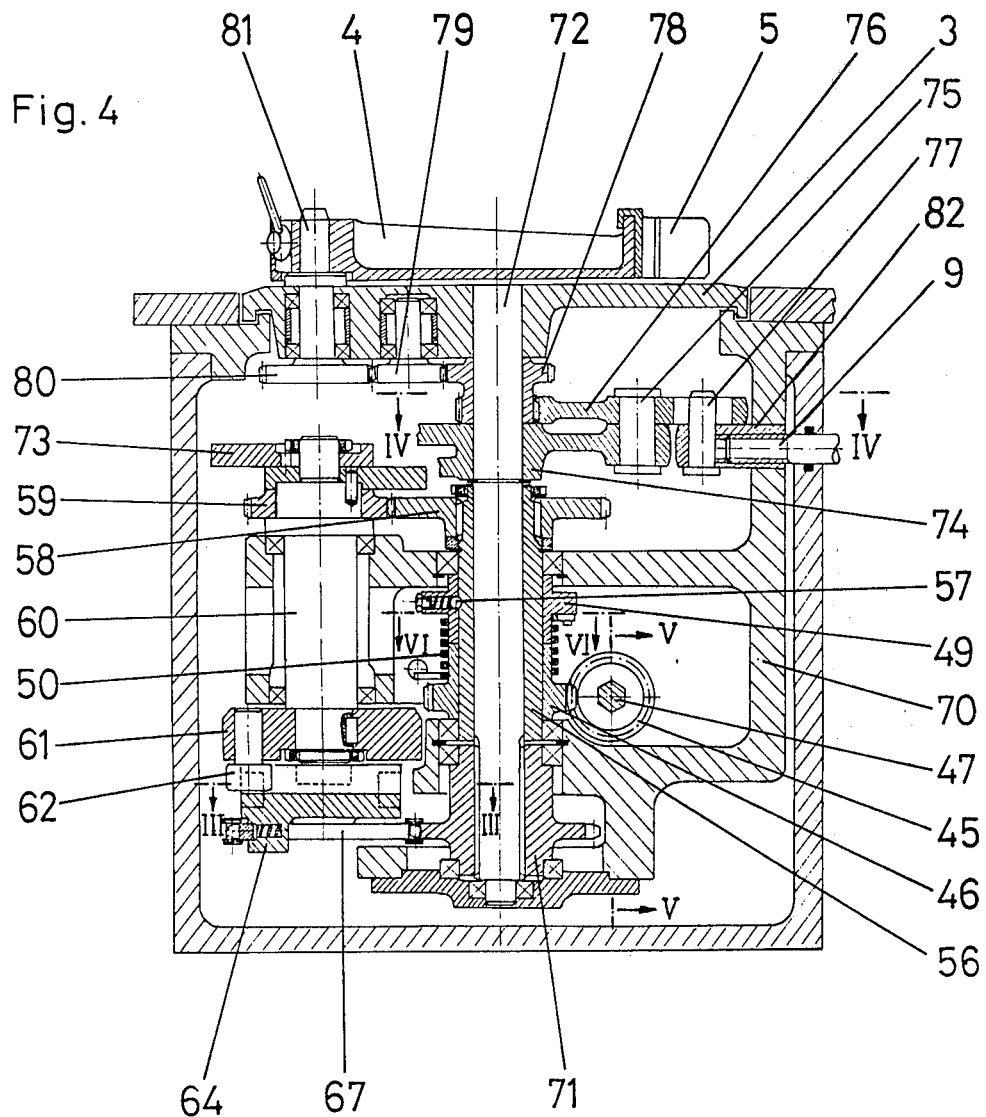
FIG. 4 is a cross section of the pusher mechanism taken on line II—II of FIG. 2.
Figure 5:
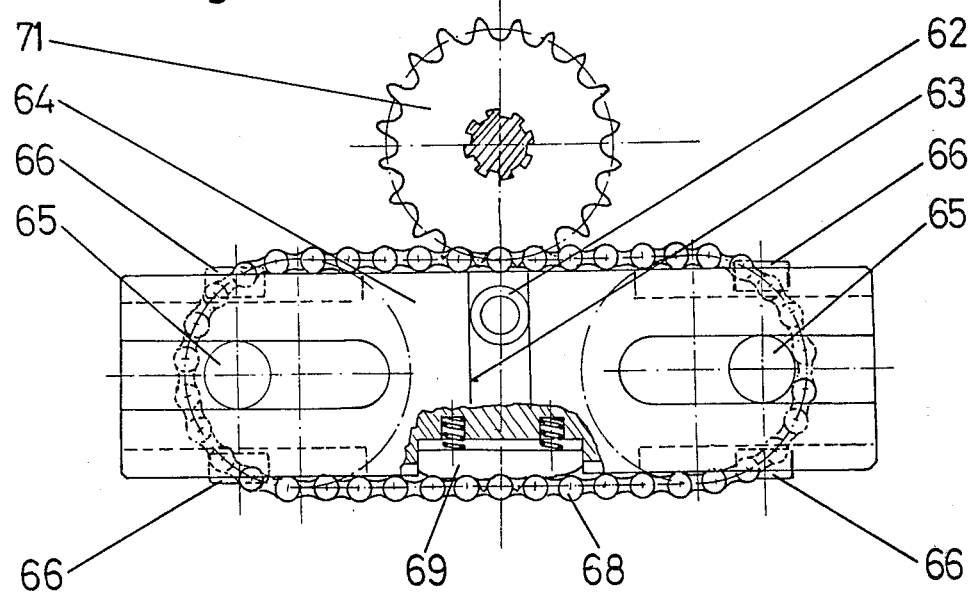
FIG. 5 is a partial cross section taken on line III—III of FIG. 4.
Figure 6:
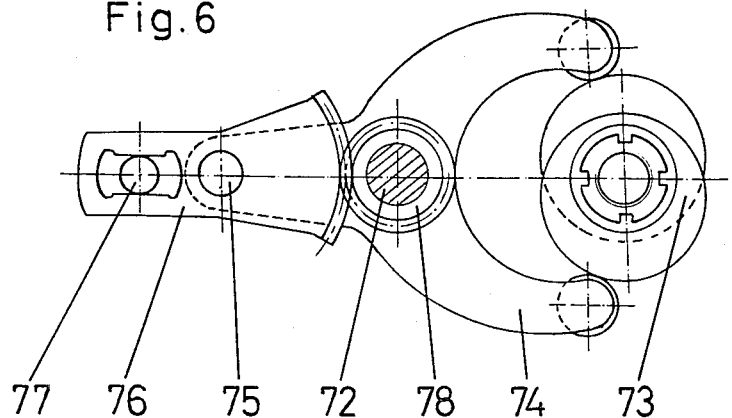
FIG. 6 is a partial cross section taken on line IV—IV of FIG. 4.
Figure 7:
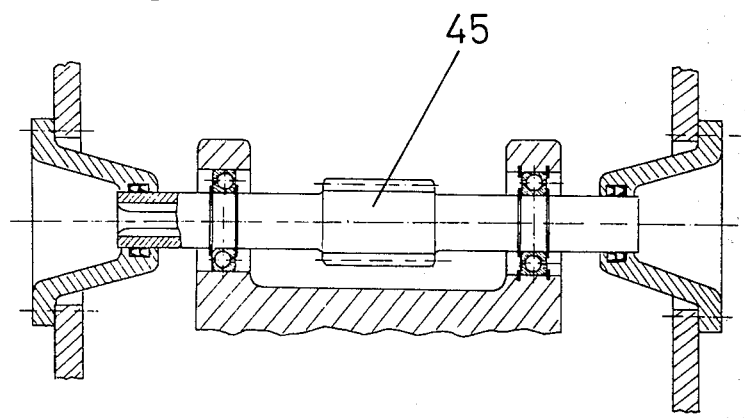
FIG. 7 is a partial cross section taken on line V—V of FIG. 4.
Figure 8:
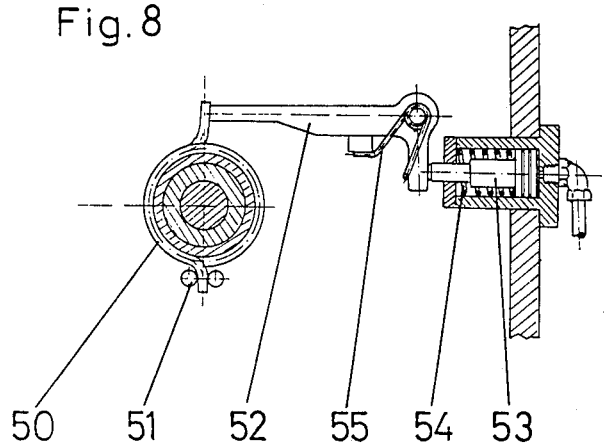
FIG. 8 is a partial cross section taken on line VI—VI of FIG. 4.

FIG. 4 shows a cross section thru the pusher mechanism 24. The imput shaft 45 has a helical gear engaging with helical gear 46. A concentric, polygonal bore in shaft 45 is aligned with the corresponding bores of the other pusher mechanisms on the conveyor. The drive shaft 47, which consists of a polygonal rod extending along the entire length of the conveyor is inserted thru the said bores and coupled to the drive 48 (see FIG. 1). The drive 48 is an infinitively variable drive e.g. a DC motor electronically controlled. By all means, when the conveyor is in operation, the drive shaft 47 must turn continuously, at a constant adjustable speed. The helical gear 46 has a cylindrical extension which aligns with a cylindrical extension of the same diameter on drive disc 49. Turning now to FIG. 8, it will be seen that upper toe of spring 50 is secured to drive disc 49 by the two pins 51. The lower toe engages with the actuator arm 52. If the helical gear 46, which is continuously turning, tends to drive by friction the spring 50 the actuator arm causes the spring to expand, releasing the helical gear 46. When a timed air impulse from the respective section actuates the piston 53, the piston rod pushes the actuator arm 52 and causes it to disengage from the spring toe. The spring closes to its interference fit. The friction contracts the spring 50 so it grips the cylindrical extension of helical gear 46. In this way the drive disc is driven at the same speed as the helical gear 46. When the air impulse is interrupted the spring 54 pushes back the piston 53 enabling spring 55 to restore the original position of the actuator arm 52 which will engage again with the lower toe of spring 50 when the latter has performed one complete revolution. The drive disc 49 transmits the rotation to the primary shaft 56 thru the spring loaded overload ball 57 engaging in a notch in primary shaft 56. Since there is only one notch, the correct position will be restored after an overload occurs. Primary shaft 56 supports a gear 58 which meshes with gear 59 mounted on secondary shaft 60. Gears 58 & 59 have the same number of teeth, so that when primary shaft 56 completes one revolution also the secondary shaft 60 will have completed one revolution. The secondary shaft 60 carries a crank 61, which as can best be seen in FIG. 5, has a roller 62 that engages with the cross slot 63 in slider 64. As the crank 61 performs one revolution the slider 64 guided by vertically mounted bearings 65 and by horizontally mounted bearings 66 is forced by roller 62 to make a linear back and forth stroke. Slider 64 carries a roller chain 68 wrapped around the two sprockets 67. A spring loaded shoe 69 keeps the roller chain under tension. The shoe 69 is toothed to prevent the roller chain from sliding over it. The shoe 69 can also be mounted in a fixed position on main bracket 70 instead of being mounted on the slider 64 as shown on FIG. 4 and 5. If mounted on the bracket 70, the shoe will keep the chain fixed relative to the bracket and the other side of the chain will make a stroke which is double the stroke of the slider 64.

The roller chain 68 engages tangentially with the sprocket 71. Sprocket 71 is caused to perform an oscillation. This movement is transmitted by an internal spline engaging with the splined portion of shaft 72 which in turn carries the disc 3. The secondary shaft 60 also carries the double cam 73 which actuates the lever 74. Lever 74 is centered around the shaft 72 and when the cam rotation causes the lever 74 to rock, the stud 75, supported on one extension of lever 74 moves along an arc of circle. Stud 75 carries gear sector 76 which is also guided by its slot engaging with pin 77. As the stud 75 moves and the pin 77 is fixed, the sector 76 is caused to rock around the axis of stud 75 and its toothed portion meshing with double gear 78 imparts a rotational movement to the same gear 78. The latter, via sun gear 79, transmits the movement to gear 80, mounted on pivot 81 which extends on top of disc 3 and carries the pusher arm 4. The pin 77 is mounted on the shifting bracket 82 which is adjusted to move nearer or farther from stud 75 thru the setting knob 9. Moving pin 77 nearer to stud 75 causes sector 76 to rock at a greater arc of circle, eventually causing pusher arm 4 to also make a greater arc of rotation. Moving pin 77 farther away from the stud 75 will result in the contrary effect.

In a system as described above, an air impulse from the respective machine section would start a pusher cycle in which the disc 3 osilcates over an arc of circle and the stud 81 would impart a swinging movement to the pusher arm 4. The two motions are compelled according to a definite law, dependent on the dimensions of the various components and in particular on the profile of cam 73, such as to generate at the pusher fingers 5 a path appropriate for a smooth transfer of the objects from the cooling plate onto the conveyor belt.

The setting knob 9 enables to increase or decrease the swinging motion of the pusher arm 4 around the axis of pivot 81, providing a control of the position of the objects on the conveyor belt.

It is a requirement that the pusher cycle is performed in a shorter time interval than it is required by the machine sections to complete their cycle. If this condition is fulfilled, the pusher mechanism will remain at rest with the clutch spring 50 engaged with the actuator arm 52 until the next impulse from the respective section starts the next cycle. Ideally the pusher cycle should take approximatively 80% of the section cycle, in order that the pusher mechanism is not compelled to move excessively fast. Another requirement is that the pusher fingers must reach a peripheral speed equal or near to equal to the speed of the conveyor belt. The speed of the conveyor belt, at a given sectional speed, may be considerably different depending on the type of machine. For instance a 8-section machine would require a conveyor with a belt moving twice as fast as the conveyor belt of a 4-section machine, always at the same sectional speed. If a pusher mechanism is functioning correctly on a 4-section conveyor, completing its cycle in 80% of the section cycle time, the same pusher, mounted on a 8-section conveyor would have to be set at double the previous speed in order to match the faster belt speed and would, therefore, complete its cycle in 40% of the section cycle time. In order to avoid this problem, means are available to modulate the rotational speed of the secondary shaft 60, with respect to the primary shaft 56.

The gears 58 and 59 can be round, elliptical or of any other shape as required, but always with the same number of teeth, so that they complete 1 revolution at the same time. Different sets of gears can be mounted depending on the belt speed requirement of the production machine. Another method of obtaining a similar effect is to move the shaped gears, e.g. elliptical gears, to a different meshing point at the cycle starting position. This would generate a different speed/position characteristic. For this purpose gear 58 is splined and gear 59 mounted on a plain seat and fixed by a nut in order to suit correctly any position of gear 58.

To convert a pusher mechanism from right hand to left hand operation or viceversa the following will be necessary: cam 73 is removed, shifted and reinstalled, the crank 61 is turned by 180° with the gear 58 & 59 out of mesh so that the starting position of roller 62 is the opposite to what it was before, and the shaft 72 is engaged in an other position into the splines of sprocket 71, so that the pivot 81 is, at its starting point, in a mirror opposite position. No change of parts is required inside the pusher mechanism; the pusher arm and fingers may need to be of different type for right versus left hand operation. The above describes the pusher mechanism as shown on FIG. 4. Of course, the same sequence of motions can be obtained with different machine elements. For instance, to transmit the movement from slider 64 to shaft 72 instead of roller chain 68 and sprocket 71 a rack secured on slider 64 engaging with a gear centered on shaft 72 could be used. A toothed belt could substitute the chain. Also two strips of flexible material, e.g. spring steel, could be fastened at each end of slider 64 and be wrapped around and secured to a pulley mounted on shaft 72. Similarly, sector 76 could be substituted by a lever mounted on the same position, keeping a strip of flexible material at both ends under tension, the said strip turning around a pulley substituting gear 78. Again, to transmit the movement from the said pulley to pivot 81, the system of gears described above could be replaced by a system of roller chain and sprockets, or of toothed belt and pulleys, or flexible strip and pulley.

Interesting possibilities are offered by the use of electronic controllers to power and control a pusher mechanism based on the principle described above. FIG. 9 is showing a cross section of a pusher mechanism electronically driven and controlled. Ratiomotor 83 is driving, thru gear 84 and gear 85 the shaft 86 which carries the disc 3 with pivot 81 on which the pusher arm 4 is secured. Ratiomotor 87 drives thru its gear 88 the double gear 89. The movement is transmitted from double gear 89 to pivot 81 in the same manner described before. A suitable controller would drive the two ratiomotors 83 and 87 according to a definite displacement/time law such as to generate the correct path and speed at the pusher arm. The ratiomotors 83 and 87 could be stepmotors or synchronous motors or any other type of motor able to follow precisely a definite displacement-/time function. Some production machine are today timed by a mini-computer based controller. With such a device, the impulse starting the pusher cycle could be used internally to trigger a programmed subroutine which in turn would produce the current output required to drive the motors in the proper manner. In order to obtain different sequences of motion to suit different applications, e.g. different numbers of sections in use, only a change in software would be required.

Other production machines are timed by hardwired sequence controllers. In this case the current output required to drive the motors could be generated by a separate microprocessor based controller triggered from the main sequence controller timing the production machine.

The program could be stored in a memory such as a PROM. Different programs to suit different applications could be stored in separate exchangeable PROMs which would constitute, in fact, a sort of "electronic cam" producing the desired motion sequence at the pusher arm. Of course, such a controller could also be used with a mechanically or pneumatically timed machine, by means of a transducer converting the starting signal into an electric signal triggering the said microprocessor based controller.

We claim:

1. Apparatus for transferring articles from a first position on a cooling plate on one side of a moving conveyor to a second position on said conveyor, said apparatus comprising:

a disc mounted on the said one side of said conveyor for rotation about a first axis;

an arm mounted on said disc for rotation about a second axis spaced laterally from and parallel to said first axis; and drive means powered by a single drive shaft for rotating both said disc and said arm about their respective axes, the locations of said axes relative to each other and to said first and second positions in combination with the rotational speeds of said disc and arm being such as to cause said arm to engage articles at said first position, to transfer the thus engaged articles from said first position to said second position, and to withdraw from the thus transferred articles in a manner permitting continued movement of said articles by said conveyor.

2. The apparatus of claim 1 wherein said drive means operates to rotationally oscillate both said disc and said arm about their respective axes.

3. The apparatus of either claims 1 or 2 wherein at the time of their arrival at said second position, said articles are caused by said arm to move in a direction and at a speed matching the direction and speed of said conveyor.

4. The apparatus of either claims 1 or 2 wherein a plurality of sets of said discs and arms are arranged along the said one side of said conveyor, each set having associated therewith a drive means, and wherein said single drive shaft extends in a direction parallel to the direction of movement of said conveyor to power each of said drive means.

5. The apparatus of either claims 1 or 2 wherein said drive means includes means for adjusting the speed of delivery of said articles onto said conveyor.

6. The apparatus of claim 2 wherein said drive means includes means for adjusting the arc in which said arm oscillates.

7. The apparatus of claim 2 wherein said drive means includes means for reversing the rotational oscillation of said disc and said arm in order to accomodate a change in the direction of movement of said conveyor.

8. The apparatus of either claims 1 or 2 further comprising means for selectively disengaging said drive means from said drive shaft.

9. The apparatus of claim 2 wherein said drive means includes: a rotating crank arranged to impart a reciprocating linear stroke to a sliding element, said sliding element in turn being mechanically connected to a shaft upon which said disc is attached and being operative to impart oscillating rotational movement to said shaft.

10. The apparatus of claim 1 wherein said drive means includes intermeshed gears, the shapes of which may be varied in order to achieve corresponding variations in the relative motions of said disc and arm.

11. Apparatus for transferring articles from a first position on one side of a moving conveyor to a second position on said conveyor, said apparatus comprising:

a disc mounted on the said one side of said conveyor for rotational oscillation about a first axis;

an arm mounted on said disc for rotational oscillation about a second axis spaced laterally from and parallel to said first axis, said arm and disc producing a continuous sweeping motion; and two separate power sources, one power source driving the motion of said disc and the other power source driving the motion of said arm, the locations of said axes relative to each other and to said first and second positions in combination with the rotational speeds of said disc and arm being such as to cause said arm to engage articles at said first position, to transfer the thus engaged articles from said first position to said second position, and to withdraw from the thus transferred articles in a manner permitting continued movement of said articles by said conveyor.

12. Apparatus of claim 11, wherein the operation of said power sources is governed by a controller whereby the relative motions of said disc and said arm can be varied.

* * * * *